No. 752,944. PATENTED FEB. 23, 1904.
J. C. ANDERSON.
RIM SPECTACLES.
APPLICATION FILED DEC. 14, 1903.
NO MODEL.
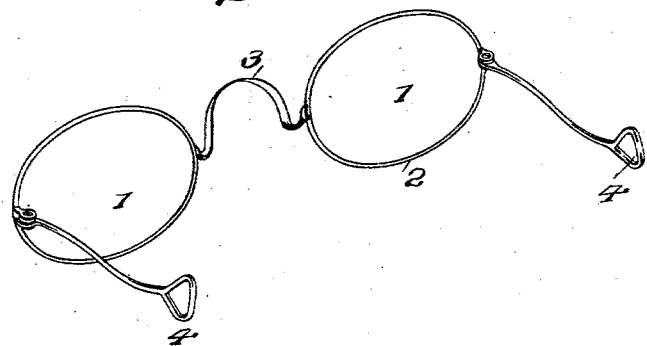
Fig. 1.
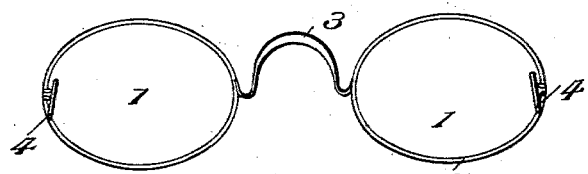
Fig. 2.
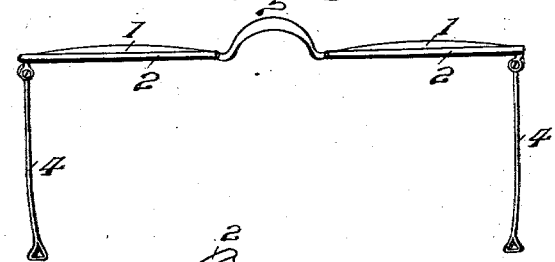
Fig. 3.
Fig. 4.
Fig. 5.
Witnesses
Inventor
James C. Anderson
By Wm C. McIntire
Attorney No. 752,944. Patented February 23, 1904.

UNITED STATES PATENT OFFICE.

JAMES C. ANDERSON, OF HIGHLAND PARK, ILLINOIS.

RIM-SPECTACLES.

SPECIFICATION forming part of Letters Patent No. 752,944, dated February 23, 1904.

Application filed December 14, 1903. Serial No. 185,052. (No model.)

*To all whom it may concern:*

Be it known that I, JAMES C. ANDERSON, a citizen of the United States, residing at Highland Park, in the county of Lake and State of Illinois, have invented certain new and useful Improvements in Rim-Spectacles; and I do hereby declare the following to be a full, clear, and exact description of the invention, such as will enable others skilled in the art to which it appertains to make and use the same.

My invention relates to certain new and useful improvements in spectacles of that type shown and described in Letters Patent No. 715,553, granted to me December 21, 1902, and in which the lens-frames are rigidly connected together by a nose-bridge and having lugs or blocks at the outer extremity of the frames, to which are pivotally connected short temple-bows (or "temples," as designated in the art) of peculiar construction and adapted to have their free ends located in the cavities between the front and rear boundaries of the "malar" bone of the skull.

It is common in the art to produce what are designated as "rimless spectacles" and "rim-spectacles." The former consist simply of two lenses connected by a rigid nose-bridge and with bows or temples pivotally connected to the lenses near their outer extremities, while the latter consist of lenses embraced by rims having the usual nose-bridge and provided at their outer meeting extremities with lugs or blocks secured in position to clamp and hold the lenses by a screw or rivet and formed with a recess or housing within which is pivotally connected by a second screw or rivet the bows which are utilized to hold the glasses in position upon the face of the user. In the rimless type it becomes necessary to employ lenses of considerable thickness and consequent weight in order to obtain that stability necessary to secure a safe and comparatively firm connection between the lenses and the bows. In the rim-glasses lenses of comparative thinness may be employed; but the rims as at present made, with the lugs or blocks extending radially from the extreme outer ends of the rims to furnish pivotal connection for the bows, must of necessity be made quite substantial and heavy in order that the leverage exerted by the bows upon the longitudinally-extended lugs or blocks shall not have the effect of springing the rims off the edges of the lenses, and these extended lugs or blocks also constitute an obstruction to the vision and give a cumbrous and unsightly appearance to the spectacles.

My invention has for its object to produce spectacles in which lenses of the thinnest gage may be employed and in which the rims may also be reduced to the minimum as to thickness and weight, thereby insuring the lightest possible weight of the entire structure and at the same time avoiding the cumbrous and obstructive longitudinally-disposed lugs or projections for pivotally connecting the bows.

With these ends in view my invention consists in constructing the rims with lugs or blocks at their meeting ends disposed at a right angle to the plane occupied by the embraced lenses and clamping the rims upon the lenses and pivotally connecting the bows by one and the same screw or rivet, as will be hereinafter and in detail explained.

In order that those skilled in the art to which my invention appertains may know how to make and fully appreciate the advantages of my improved spectacles, I will proceed to describe the same, referring by numerals to the accompanying drawings, in which—

Figure 1 represents in perspective a pair of spectacles embodying the novel features of my invention. Fig. 2 is a front view of the same. Fig. 3 is a top or plan view with the temples in open position. Fig. 4 is a detail top or plan view on enlarged scale and showing the rim in section, and Fig. 5 is a detail perspective view showing the temple separated from the lug or block on the rim.

Similar reference-numerals indicate like parts in the several figures of the drawings.

1 represents the lenses, 2 2 the rims joined by a nose-bridge 3, and 4 represents the temples or short bows, such as described and illustrated in the patent hereinbefore referred to.

The meeting ends of the rims 2 are each formed or provided with lugs or blocks 5, having a kerf or slot adapted to receive the inner end of the temple or bows and with a transverse channel to receive a screw or rivet 6, by which the rims are securely clamped upon the lenses 1 and which also secures the temple or bow 4 vibratively to the lug or block. These lugs or blocks 5, as is clearly shown, occupy a position at right angles to the plane of vision of the spectacles in contradistinction to being radially or longitudinally extended beyond the boundary of the rims, as is customary, or at such an angle that destructive leverage occurs. This disposition of the lugs 5 behind the rims avoids the cumbrous and unsightly appearance which exists where the lugs or blocks extend longitudinally, as described, and as will be readily appreciated the leverage exerted at the ruler-joint between the lugs and the bows is exerted directly against and substantially at right angles to the rim and is transmitted longitudinally through the longer axis of the lenses to the frame at the inner extremity of the lens, thus lessening or entirely eliminating the tendency to buckle or twist the rim off the lens at its outer extremity, as is the case where the lug or block extends radially or longitudinally beyond the outer boundary of the rim. This novel construction and relative arrangement of the rims and the lugs or blocks not only enables me to use lenses much thinner than are possible in the ordinary construction, but the rims may also be much more attenuated, and consequently the entire structure is much lighter as a whole and can be produced much more economically than as at present constructed. Another and important result of this construction and arrangement of the lugs or blocks is that when used in connection with the particular kind of spectacles shown and described in the Letters Patent hereinbefore referred to the vibrative connections between the lugs or blocks and the temples or bows occupy planes nearer to the face of the wearer, and therefore adapt the free ends of the temples or bows to be properly and effectively located in the cavities between the front and rear boundaries of the malar bone of the skull.

The fact that the same screw or rivet which is used to clamp the rim upon the lens is also employed to pivotally connect the bow to the lug results in bringing the axis of vibration of the bow close to the rim, and consequently shortens the leverage strain produced by the bows.

I desire to call especial attention to and emphasize the fact, hereinbefore referred to, that any leverage strain exerted by the bow instead of tending to twist the rim off the lens is transmitted through the longer axis of the lens and in reality operates to tighten the grip or hold the rim upon the lens, and while I have shown and prefer that the lugs or blocks 5 should be disposed at a right angle to the rims, as described, I wish it to be understood that I do not wish to be limited to this exactitude of relation between the lugs or blocks and the rims, so long as the lugs trend rearwardly from the frame at such an angle thereto that the leverage strain exerted by the bows shall be transmitted, as described, through the longitudinal axis of the lenses to draw or clamp the inner end of the rim in contact with the corresponding edge of the lens.

Having described the construction and advantages of my improved spectacles, what I claim as new, and desire to secure by Letters Patent, is—

1. As a new article of manufacture, rims for spectacles connected at their inner ends by a nose-bridge, and formed or provided with lugs or blocks at their outer ends at a right angle to, and extending rearwardly from the rims, and adapted to clamp said rims upon lenses; temples located within the lugs or blocks, and a single screw securing the temples in vibrative position, and adapted to clamp the rims upon lenses, substantially as hereinbefore set forth.

2. In spectacles, the combination with a pair of lenses, rims connected at their inner ends by a nose-bridge and formed or provided with lugs or blocks at their outer ends, at a right angle to and extending behind the rims; temples located within the lugs or blocks, and a single screw securing the temples in position and clamping the rims upon the lenses, substantially as hereinbefore set forth.

In testimony whereof I have signed my name to this specification in the presence of two subscribing witnesses.

JAMES C. ANDERSON.

Witnesses:
  JNO. J. HARROWER,
  D. G. STUART.